United States Patent [19]
Van Dieren

[11] 3,960,733
[45] June 1, 1976

[54] FILTER UNIT FOR WASHING MACHINE

[76] Inventor: Harry M. Van Dieren, 3137 W. 100th St., Evergreen Park, Ill. 60622

[22] Filed: Jan. 29, 1975

[21] Appl. No.: 545,098

[52] U.S. Cl. .............................. 210/460; 210/474; 210/485
[51] Int. Cl.² ......................................... B01D 23/00
[58] Field of Search .......................... 210/448–457, 210/460, 474, 484, 485, 499

[56] References Cited
UNITED STATES PATENTS

| 989,473 | 4/1911 | Andersen | 210/485 X |
| 3,638,799 | 2/1972 | Serowiecki | 210/474 X |
| 3,804,258 | 4/1974 | Okuniewski | 210/460 |

Primary Examiner—Charles N. Hart
Assistant Examiner—Richard W. Burks
Attorney, Agent, or Firm—Hume, Clement, Brinks, Willian, Olds & Cook, Ltd.

[57] ABSTRACT

A filter unit for filtering lint from liquid washing machine effluent. The unit comprises a semi-rigid frame, preferably molded in plastic and consisting of a horizontal top rim, vertically depending frame elements, horizontally disposed bottom frame elements or portions thereof, and a mounting bracket which seats on one wall of a wash tub. A filter screen is mounted within the frame. The screen is a plastic mesh and forms closed sides and a bottom with an open mouth. A removable cap seats over the mouth and a washing machine drain hose extends through an aperture of predetermined size and shape into the screen within the frame.

2 Claims, 5 Drawing Figures

FILTER UNIT FOR WASHING MACHINE

FIELD OF THE INVENTION

This invention is in the field of clothes washing machines. It is, more particularly, related to the handling of effluent liquid from conventional clothes washing machines.

BACKGROUND OF THE INVENTION

The effluent from a conventional home washing machine normally contains a substantial amount of lint; i.e., particles of the fibers which make up the fabric being washed. This lint accumulates in sewer drains and periodically causes restricted flow or even clogging of the drain. As can readily be understood, it is advantageous to filter out as much of this lint as possible.

SUMMARY OF THE INVENTION

A primary object of the present invention is to provide an improved filter unit for filtering the lint from home washing machine effluent. Another object is to provide a simple and inexpensive filter which is readily accessible to the user of the washing machine. Still another object is to provide a unit which is simple and inexpensive in construction, yet provides a long service life. Still another object is to provide a unit which has a substantial lint carrying capacity and has to be serviced only infrequently.

The foregoing and other objects are realized in accord with the invention by providing a filter unit comprising a frame in the form of a rectangle or a cylinder. Regardless, the side wall and the base of the frame are formed by a plastic mesh screen material having openings 1/16 inch square. In the case of the rectangular box frame, the four sides and the bottom of the frame are of such dimensions that the screen sections are at least 7 inches by 7 inches in size. The depth of the box is preferrably 8 inches. In the case of the cylindrical frame, a diameter of at least 7 inches is necessary. The cylinder depth is preferrably 8 inches.

The unit contains attachment means extending horizontally from the upper rim of the frame. The unit is suspended from the side of a wash tub adjoining the washing machine by this attachment means. The washing machine drain hose is inserted into the open top of the container. Lint collects in the container as the effluent water passes through the mesh and the mesh area and guage are of such dimensions that maximum effluent flow is achieved while collecting substantial amounts of lint before service of the unit is required.

DESCRIPTION OF THE PREFERRED EMBODIMENTS

Figure 1:
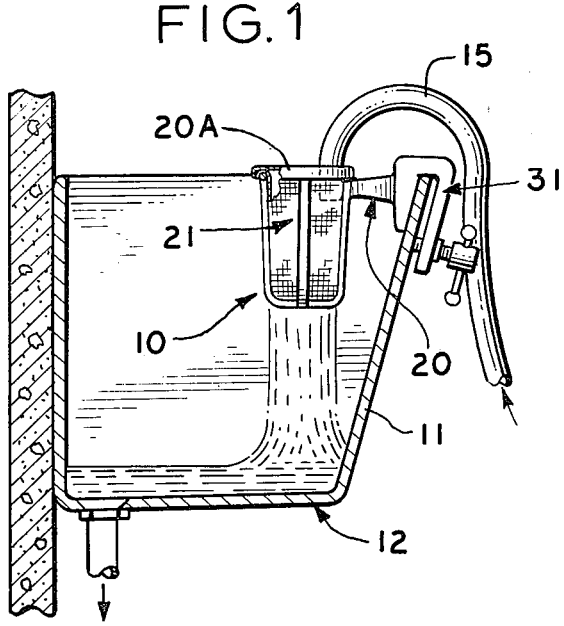
FIG. 1 is a sectional view through a wash tub adjacent a washing machine illustrating a first form of the filter unit embodying features of the invention.

Referring now to the drawing, and particularly to FIG. 1, a filter unit 10 embodying features of the invention is illustrated in mounted relationship on the side 11 of a wash tub 12 which conventionally is seated adjacent a home washing machine (not shown). A segment 15 of the free end of a washing machine drain hose is illustrated extending into operational relationship with the unit 10.

The filter unit 10 comprises a frame 20 and a plastic wire mesh filter 21 constructed and arranged according to the present invention. The frame 20 and the filter 21 are illustrated separately in FIGS. 2 and 3 of the drawing, respectively.

Figure 2:
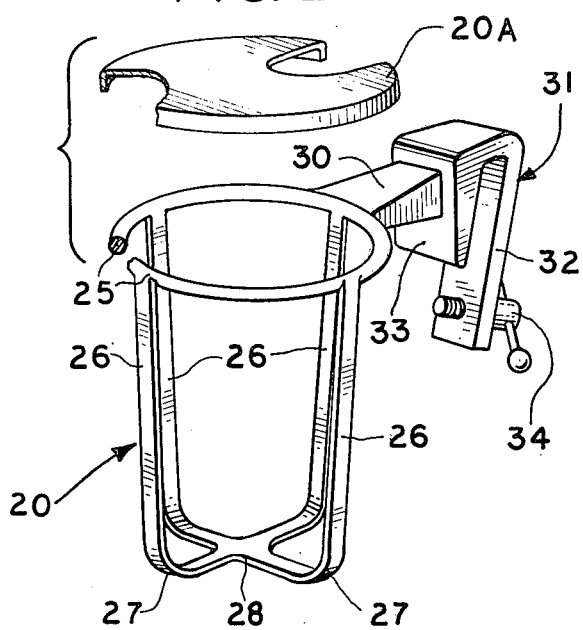
FIG. 2 is a perspective view of the frame for the unit illustrated in FIG. 1, before insertion of the plastic wire mesh filter and mounting on the wash tub.

Referring to FIG. 2, the filter frame 20 is injection molded in one piece of plastic. The frame 20 includes an annular top rim 25 from which four vertical frame elements 26 depend at the four quadrants of the rim. The frame elements 26 are curved inwardly adjacent their lower ends, as at 27, and connect with each other at the bottom, center of the frame 28.

Extending horizontally from the annular rim 25 is a support arm 30. The support arm 30 carries, at its free end, an inverted L-shaped clamp member 31. The longer leg 32 of the clamp member 31 is separated from a shorter leg 33 thereof by approximately 1½ inches. Extending through the lower end of the leg 32, below the lower extremity of the leg 33, is a screw clamp 34 of well-known construction.

Figure 3:
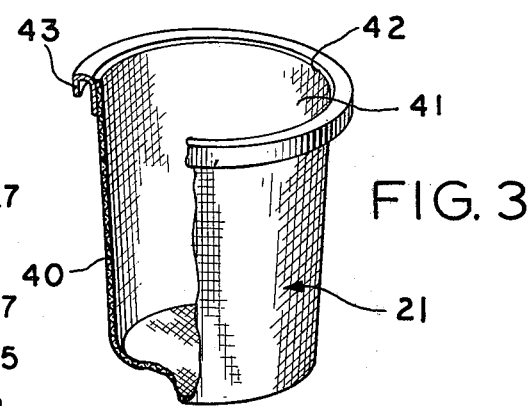
FIG. 3 is a perspective view of the plastic wire mesh utilized as a filtering medium in the unit illustrated in FIGS. 1 and 2.

Turning now to FIG. 3, the plastic wire mesh filter screen 21 comprises a "bag" 40 formed of the mesh. The bag 40 is at least 7 inches in diameter at its open upper end 41. A semi-rigid ring 42 defines the upper opening in the filter screen and is annular in configuration, having a 7 inch diameter also. Extending around the ring 42 is an annular, depending lip 43.

The mesh is fabricated of plastic "wire," as has been pointed out. According to the invention the mesh has openings 1/16 inch square. The bag 40 depends at least 7 inches and preferrably 8 inches from the ring 42.

As seen again in FIG. 1, the mesh screen 21 seats within the frame 20 so that the ring 42 seats against the rim 25. In this position, the annular lip 43 on the ring 42 overlies the rim 25 on the frame 20 and locks the filter screen 40 in place. The length of the filter screen 40 is such that the bottom of the screen rests loosely on the frame elements 26 at their lower ends, where they meet at a center point 28.

As seen in FIG. 1, the inverted L-shaped clamp 31 seats over the free upper edge of one side 11 of the tub 12. The inner leg 33 bears against the inner surface of the side 11 while the outer leg 32 is forced away therefrom by turning the screw clamp 34. In this manner, the unit 10 is rigidly but removably locked to the tub 12.

The washing machine hose end 15 is inserted into the open top of the unit 10. As effluent departs the hose 15 it accumulates in the wire mesh filter screen 40. The size of the screen openings being 1/16 inch permits water to pass rapidly through while retaining the great bulk of the lint particles in the effluent. The overall size of the screen is such that a substantial accumulation of lint can take place before any substantial reduction in performance of the unit 10 is effected.

Figure 4:
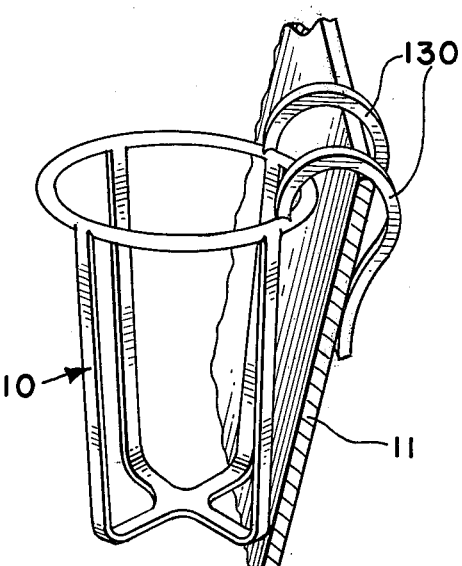
FIG. 4 is a perspective view, similar to FIG. 2, illustrating a modification of the first form of filter frame for mounting the plastic wire mesh filter illustrated in FIG. 3.

Referring now to FIG. 4, a modification of the first form of filter unit is illustrated at 110. The filter unit 110 is identical to the unit 10 except for the curved mounting hooks 130 which replace the arm 30 and clamp 31, hereinbefore described in relationship to the unit 10. The hooks 130 are designed to hang over the edge of the tub side 11 and support the unit 110 loosely. Otherwise, it functions in a manner identical to the unit 10 hereinbefore described.

Figure 5:
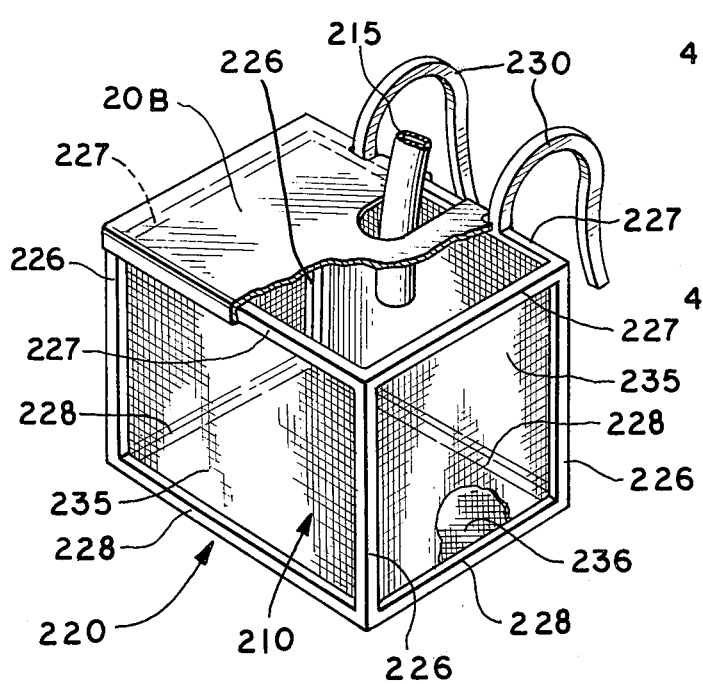
FIG. 5 is a perspective view of a second form of filter unit embodying features of the invention.

A second form of filter unit embodying features of the invention is illustrated at 210 in FIG. 5. The filter unit 210 comprises a box-like frame 220 and a plastic wire mesh filter 221 constructed and arranged according to the invention.

The frame 220 is fabricated of wood or plastic injection molded and has vertical frame elements 226 at its four corners, interconnected by upper horizontal frame elements 227 and lower horizontal frame elements 228.

Extending outwardly from one of the upper horizontal frame elements 227 are hooks 230. The hooks 230 are designed to hang over the upper edge of the tub side wall 11 and support the unit 210 loosely in the manner hereinbefore discussed in relation to the filter unit 110.

Fastened to the inner surface of corresponding frame elements 226, 227, 228, forming each side 235 and the bottom 236 of the filter unit 210, are generally square pieces of plastic wire mesh having openings which are 1/16 inch square. The mesh pieces 235 and 236 are fastened to the wood frame elements 226-228 by any conventional means, such as tacking or the like. The mesh pieces are, as has been pointed out, at least 7 inches by 7 inches square. The unit 210 might actually be a little deeper, 8 inches being preferable.

The washing machine hose end 215 is inserted in the open top of the unit 210. As the effluent departs the hose 215, it accumulates in the plastic wire mesh filter screen 240. Once again, the size of the screen openings permit water to pass rapidly through while maintaining the great bulk of the lint particles in the effluent. Other advantages inherent in the unit 110 and 210 are also provided.

Referring to FIGS. 1 and 2, a "splash cap" 20A may also be utilized according to the invention. As seen in this form of the invention, the cap fits snugly over the rim 25 and has a radially extending hose aperture in it for passing the hose 15. The hose aperture must be at least 3 inches long (radial dimension) and 1½ inches wide (circumferential dimension). It prevents drain liquid from splashing out of the wash tub.

The "splash cap" 20B in the form of the invention is seen in FIG. 5. Here the cap is rectangular, of course. It performs the same function.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A filter unit for filtering the lint from liquid washing machine effluent, comprising:
    a. a substantially rigid frame,
    b. said frame including a generally horizontal upper rim,
    c. said frame further including a plurality of vertically extending, horizontally spaced frame elements depending from said rim,
    d. said frame also including horizontally disposed frame elements or portions thereof forming a bottom of the frame,
    e. a filter screen comprising a wire mesh having predetermined size openings and disposed in said frame so as to depend from said rim,
    f. said filter screen extending between and supported by said frame elements whereby an open mouth is defined by said rim,
    g. said frame adapted to be seated in a drain tub on one side thereof whereby liquid effluent introduced to said open mouth through a drain hose passes into the tub leaving particulate matter which is entrained in it on the screen within the filter unit,
    h. a removable splash cap seated on said frame rim over said open mouth,
    i. said splash cap having an elongated opening formed therein for receiving the end of a drain hose.

2. The filter unit of claim 1 further characterized in that:
    a. said elongated opening is at least 3 inches long and at least 1½ inches wide.

* * * * *